United States Patent [19]

Naito

[11] Patent Number: 5,140,232
[45] Date of Patent: Aug. 18, 1992

[54] BRUSHLESS MOTOR DRIVE CIRCUIT
[75] Inventor: Hayato Naito, Komagane, Japan
[73] Assignee: Sankyo Seiki Mfg. Co., Ltd., Nagano, Japan
[21] Appl. No.: 547,794
[22] Filed: Jul. 3, 1990
[30] Foreign Application Priority Data
Jul. 3, 1989 [JP] Japan .................. 1-172548
[51] Int. Cl.$^5$ .............................. H02P 6/02
[52] U.S. Cl. ................... 318/138; 318/254; 318/380
[58] Field of Search ............ 318/254, 138, 368, 375, 318/380, 759

[56] References Cited
U.S. PATENT DOCUMENTS

| | | | |
|---|---|---|---|
| 3,566,227 | 2/1971 | Edhlund | 318/258 |
| 3,611,092 | 10/1971 | Wilmunder | 318/258 |
| 4,426,606 | 1/1984 | Suita et al. | 318/767 |
| 4,494,056 | 1/1985 | Nishijima et al. | 318/269 |
| 4,633,150 | 12/1986 | Inaji et al. | 318/254 |

OTHER PUBLICATIONS

Gottlieb, Irving M., Electric Motors & Electronic Motor Control Techniques, Howard Sams & Co., Inc., pp. 133–134.

Primary Examiner—David Smith, Jr.
Attorney, Agent, or Firm—McAulay Fisher Nissen Goldberg & Kiel

[57] ABSTRACT

A brushless motor drive circuit comprises a stator having m-phase drive coils, a rotor having magnetic poles, a position detecting element for generating m-phase output signals in accordance with the positional relationship between the rotor and the stator, electric current capable of flowing through the m-phase drive coils of the stator in either direction, a plurality of switching devices for switching the current being supplied to the m-phase drive coils in accordance with the output signals from the position detecting element, a current control circuit for controlling the level of the current being supplied to the drive coils utilizing the group of switching devices and a brake circuit for braking the rotor by feeding back the counter electromotive voltage generated when the current being supplied to the drive coils is interrupted so as to suppress the voltage to about half of the power source voltage for the drive circuit. With such an arrangement, since the counter electromotive voltage is suppressed to about half of the power source voltage, a brushless motor drive circuit according to the invention is free from any malfunctions.

6 Claims, 8 Drawing Sheets

BRUSHLESS MOTOR DRIVE CIRCUIT

BACKGROUND OF THE INVENTION

1. Field of the Invention

This invention relates to a brushless motor drive circuit.

2. Background Prior Art

A motor drive circuit is generally classified as a current drive type or a voltage drive type. Normally, a brushless motor drive circuit of the voltage drive type is automatically braked by inactivating the supplied rotary command. On the other hand, however, a brushless motor drive circuit of the current drive type cannot be braked by inactivating the rotary command and requires a brake circuit to be added to the drive circuit.

FIG. 9 of the accompanying drawings shows a known brushless motor drive circuit of the current drive type comprising a brake circuit (disclosed in Japanese Patent Disclosure No. 58-172992).

The disclosed brushless motor drive circuit has a group of switching devices 1 and a brake circuit 3. The group of switching devices 1 comprises switching devices 12a and 12b. The switching device 12a is constituted by transistors $Q_{10}$ through $Q_{12}$ and $Q_{20}$ through $Q_{22}$. The switching device 12b is constituted by transistors $Q_{13}$ through $Q_{15}$ and $Q_{23}$ through $Q_{25}$ and a resistor $R_1$. The brake circuit 3 comprises transistors $Q_{30}$ through $Q_{32}$ and is so designed to respectively connect their collectors to the bases of the transistors $Q_{13}$ through $Q_{15}$ so that a brake signal is applied to each of the transistors $Q_{13}$ through $Q_{15}$.

For starting the motor, select signal Sda is supplied to each of the bases of the transistors $Q_{10}$ through $Q_{12}$ to turn off the transistors $Q_{20}$ through $Q_{23}$ and, at the same time, select signal Sdb is supplied to each of the bases of the transistors $Q_{13}$ through $Q_{15}$ to turn on the transistors $Q_{23}$ through $Q_{25}$. Then, the rotor of the motor is driven to rotate as the current supplied to the drive coils Lu, Lv and Lw is sequentially switched.

For stopping the rotary movement of the rotor, the select signals Sda and Sdb are cut off to turn off all the transistors $Q_{20}$ through $Q_{25}$ of the switching devices 12a and 12b. Then, brake signal Bs is applied to each of the bases of the transistors $Q_{30}$ through $Q_{32}$ of the brake circuit 3. This causes the transistors $Q_{23}$ through $Q_{25}$ of the switching device 12b to be turned on once again. Consequently, the counter electromotive voltages generated in the drive coils Lu, Lv and Lw are brought into a short-circuit condition to brake the drive circuit.

With such a conventional brushless motor drive circuit as described above, the potentials of the middle points C of the drive coils Lu, Lv and Lw are lowered as low as the ground potential when the transistors $Q_{23}$ through $Q_{25}$ are turned on so that consequently the potentials of the edges U, V and W of the drive coils Lu, Lv and Lw become lower than the ground potential because of the negative counter electromotive voltages involved. Moreover, the reactive current which is used for turning on the switching device 12b and is significant in any sense, remains alive after the rotor is stopped.

PROBLEMS TO BE SOLVED BY THE INVENTION

While a brushless motor drive circuit as described above is typically realized in the form of an integrated circuit (IC), it can be accompanied by problems such as oscillation of the circuit and malfunctions including latchups and destruction of the IC itself because of activated parasitic transistors (that can appear when an inverse voltage is applied to the IC) near the transistors $Q_{20}$ through $Q_{25}$.

A possible solution to these problems may be the addition of a protective circuit to the IC. However, while such an additional circuit can actually reduce such problems to some extend, it is scarcely effective to counter electromotive voltages having a large amplitude and inevitably entails increase in the dimensions of the IC. This, in turn, raises the overall cost of the IC.

Another possible solution may be in turning on all the transistors $Q_{20}$ through $Q_{22}$ of the switching device 12a. However, with such a technique, the potential of the middle point C of the drive coils Lu, Lv and Lw rises near the power source voltage $+Vcc$ and that of the terminals U, V and W of the respective drive coils Lu, Lv and Lw can become higher than $+Vcc$ because of positive counter electromotive voltage, inducing an inverse voltage to be applied to the IC. This causes problems similar to those described above.

Moreover, with such an arrangement, the reactive current which is used to turn on the transistors $Q_{23}$ through $Q_{25}$ of the switching device 12b remains alive unless the brake signal Bs is suspended, even if the rotor of the motor is stopped.

PRIMARY OBJECT OF THE PRESENT INVENTION

It is therefore a primary object of the present invention to provide a brushless motor drive circuit which is capable of suppressing the counter electromotive voltage below a given value when the brake is applied thereto, which is free from any reactive current at the time of application of the brake and is dimensionally small.

According to the invention, the above object is achieved by providing a brushless motor drive circuit comprising a stator having m-phase drive coils, a rotor having magnetic poles, position detecting means for generating m-phase output signals in accordance with the positional relationship between the rotor and the stator, electric current capable of flowing through the m-phase drive coils of the stator in either direction, a plurality of switching devices for switching the current being supplied to the m-phase drive coils in accordance with the output signals from the position detecting means, current control means for controlling the level of the current being supplied to the drive coils by means of the plurality of switching devices and a brake circuit for braking the rotor by feeding back the counter electromotive voltage generated when the current being supplied to the drive coils is interrupted so as to suppress the counter electromotive to a fractional portion of the power source voltage for the drive circuit. In one form of the invention, this fractional portion is about one half.

In a preferred mode of embodying the present invention, a brushless motor drive circuit according to the invention is provided with a brake release circuit for rendering the brake circuit ineffective.

With a brushless motor drive circuit as described above, the position detecting means provides m-phase output signals in accordance with the positional relationship between the rotor and the stator. The current being supplied to m-phase drive coils are switched by the groups of switching devices in accordance with the output signals from the position detecting means. The level of the current supplied to the drive coils is controlled by the current control means. The brake circuit brakes the rotor by feeding back the counter electromotive voltage generated when the current being supplied to the drive coils is interrupted so as to suppress the voltage to about a half of the power source voltage for said drive circuit. With such an arrangement, the counter electromotive voltage is consumed to brake the rotor.

When a brushless motor drive circuit according to the invention is provided with a brake release circuit, the brake circuit can be rendered ineffective.

For a better understanding of the present invention, reference is made to the following description and accompanying drawings, while the scope of the invention is printed out by the appended claims.

DESCRIPTION OF THE PREFERRED EMBODIMENTS

In the following description, the term "positive side" signifies the side of a drive circuit where electric currents flow into drive coils, whereas the term "negative side" refers to the side of the circuit where electric currents flow out of the drive coils.

Figure 1:
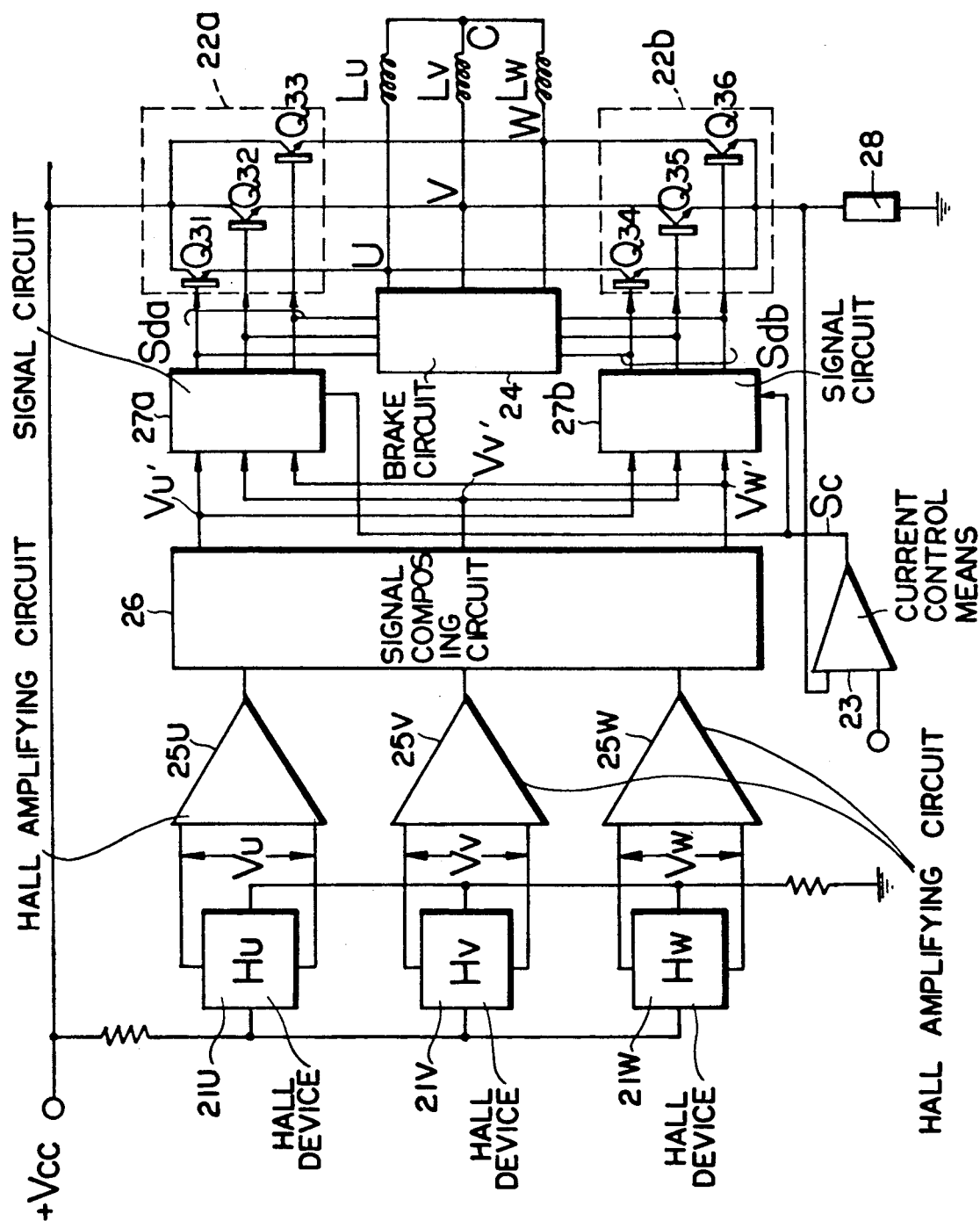
FIG. 1 is a block diagram of a first preferred embodiment of the invention.

FIG. 1 shows a block diagram of a first preferred embodiment of the invention, which is realized as a 3-phase 120° switching current supply system having three position detecting means and a brake circuit (24).

In FIG. the brushless motor drive circuit comprises at least a stator (not shown), a rotor (not shown), Hall devices $21u$, $21v$ and $21w$ which serve as so many position detecting means, a current control means 23 and a brake circuit 24. These components are described below.

Figure 3:
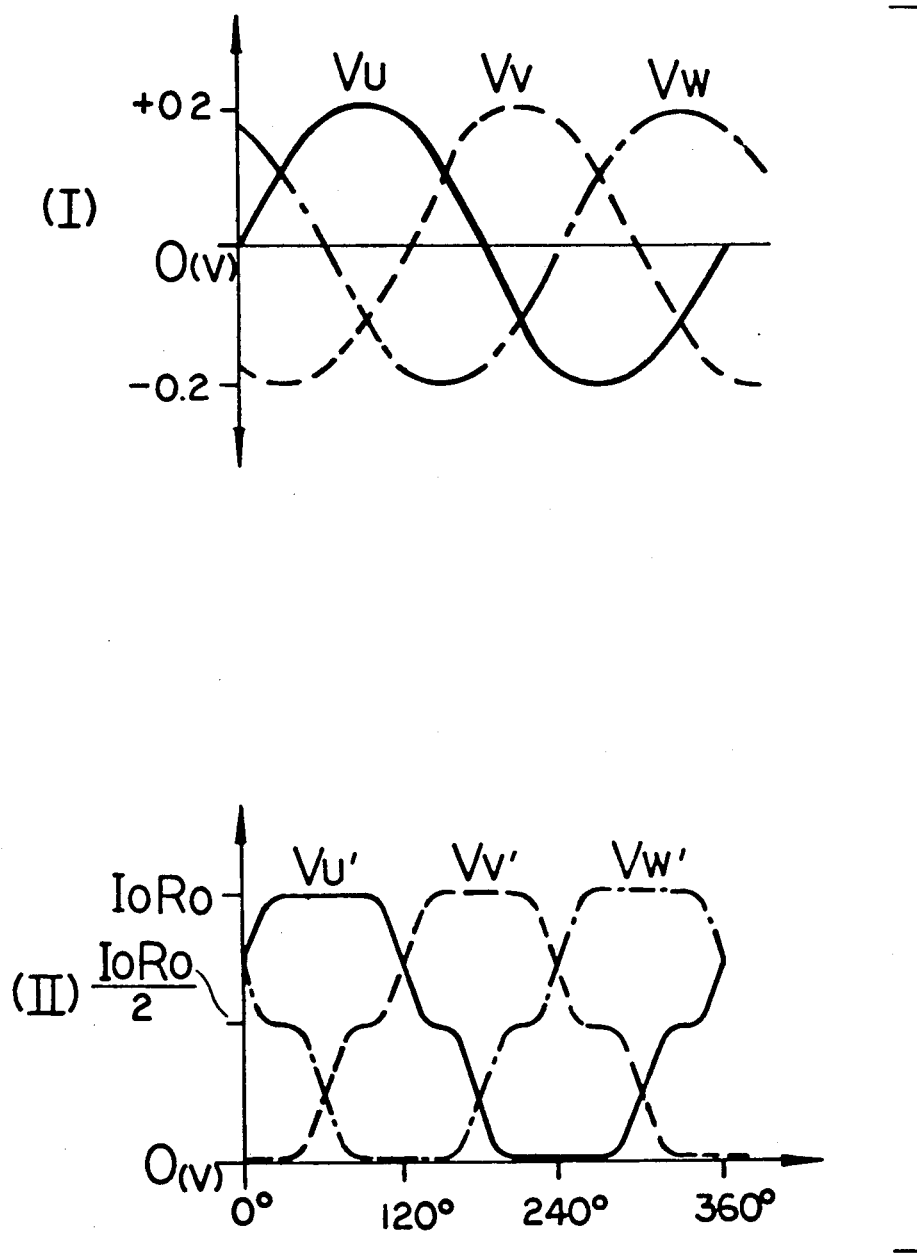
FIGS. 3(I) and (II) show waveforms produced by the embodiment of FIG. 1.

The stator has m-phase drive coils and the rotor has magnetic poles. The Hall devices $21u$, $21v$ and $21w$ generate 3-phase output signals Vu, Vv and Vw as illustrated in FIG. 3(I) in accordance with the positional relationship between the stator and the rotor. The output signals Vu, Vv and Vw are supplied to Hall amplifying circuits $25u$, $25v$ and $25w$. Signal composing circuit 26 transforms the output signals Vu, Vv and Vw from the Hall devices $21u$, $21v$ and $21w$ into rectangular pulse signals as illustrated in FIG. 3(II) by flattening the inflection points of the output signals and composes 3-phase soft switching signals out of such pulse signals.

Output signals of the signal composing circuit 26 are supplied to signal circuits 27a and 27b. The signal circuits 27a and 27b are designed so that they generate a positive side select signal Sda and a negative side select signal Sdb by adjusting the amplitude of the output signals independently for the positive side and for the negative side in accordance with current error signal Sc from the current control means 23. Positive and negative side groups of switching devices 22a and 22b comprises transistors $Q_{31}$ through $Q_{36}$ and are designed to switch the current supplied to the 3-phase drive coils Lu, Lv and Lw by means of the positive side select signal Sda from the positive side group of switching devices 22a and the negative side select signal Sdb from the negative side group of switching devices 22b.

While the groups of switching devices 22a and 22b of the above embodiment are constituted by transistors $Q_{31}$ through $Q_{36}$, the transistors may be replaced by field effect transistors or thyristors.

While the select signals Sda and Sdb are soft switching signals produced by the Hall amplifying circuits $25u$, $25v$ and $25w$, the signal composing circuit 26 and the signal circuits 27a and 27b in the above embodiment, such select signals Sda and Sdb may be alternatively obtained by means of other techniques including a 120° current supply technique, a 180° current supply technique and an analog current supply technique.

The current control means 23 compares the detection signal transmitted from current detecting resistor 28 upon detection of the level of the current running through the drive coils Lu, Lv and Lw and a predetermined reference level of the current to be supplied to the drive coils Lu, Lv and Lw and produces a current error signal Sc for controlling the level of the current being supplied to the drive coils Lu, Lv and Lw. While the current level is fed back by the current control means 23 to control the level of the current being supplied to the drive coils Lu, Lv and Lw in the above embodiment, the control system may be differently configured so long as it can effectively control the current level.

Brake circuit 24 takes in the counter electromotive voltage of the 3-phase drive coils Lu, Lv and Lw which exists when the select signals Sda and Sdb for the groups of switching devices 22a and 22b are suspended and suppresses the voltage to as low as about a half of the power source voltage +Vcc in order to brake the rotor.

Figure 2:
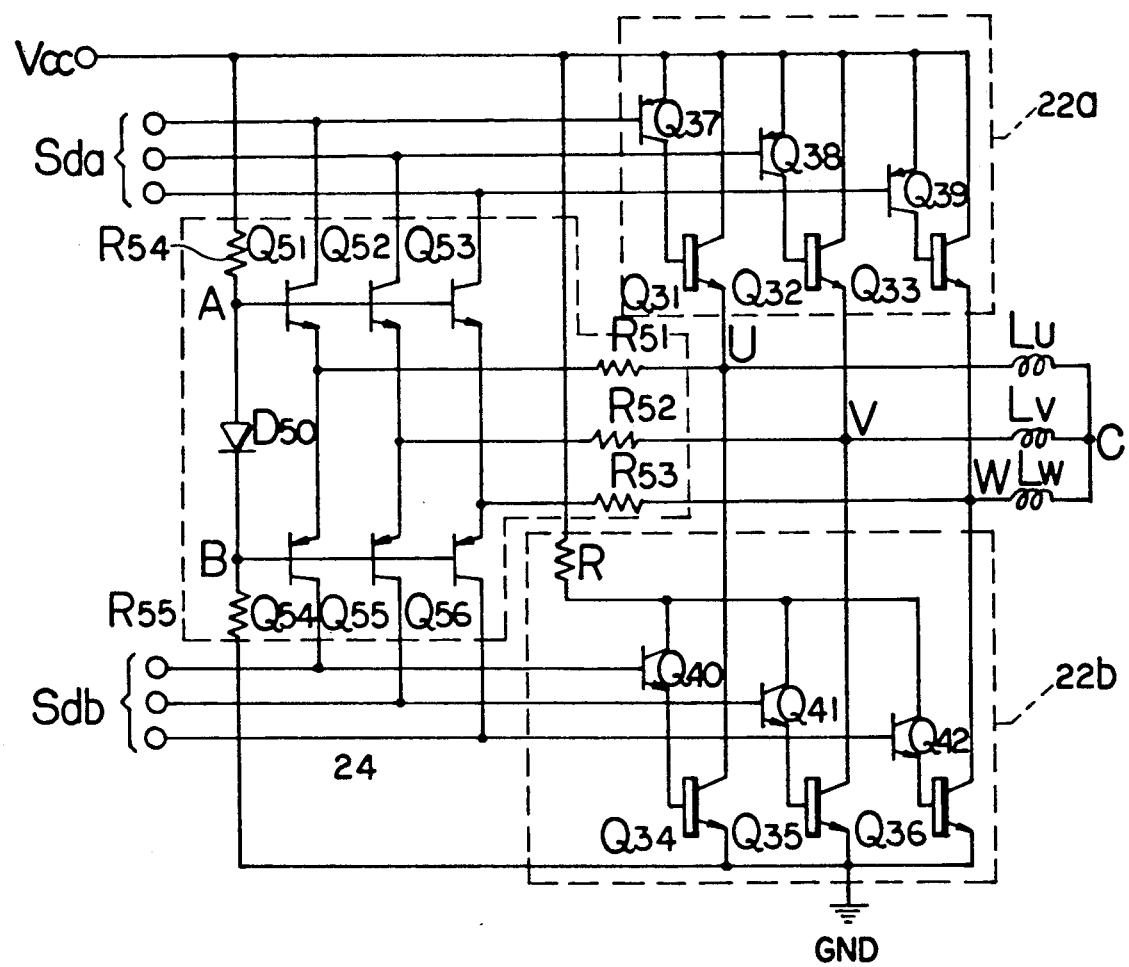
FIG. 2 is a circuit diagram of the brake circuit and the group of switching devices of the embodiment of FIG. 1.

FIG. 2 shows the configuration of the groups of switching devices 22a and 22b and that of the brake circuit 24. The group of switching devices 22a comprise transistors $Q_{31}$ through $Q_{33}$ and $Q_{37}$ through $Q_{39}$, whereas the roup of switching devices 22b comprise transistors $Q_{34}$ through $Q_{36}$ and $Q_{40}$ through $Q_{42}$. The brake circuit comprises resistors $R_{51}$ through $R_{55}$, NPN transistors $Q_{51}$ through $Q_{53}$, PNP transistors $Q_{54}$ through $Q_{56}$ connected respectively thereto and a diode $D_{50}$. The collectors of the NPN transistors $Q_{51}$ through $Q_{53}$ are connected respectively to the bases of the transistors $Q_{37}$ through $Q_{39}$, while the collectors of the PNP transistors $Q_{54}$ through $Q_{56}$ are connected respectively to the bases of the transistors $Q_{40}$ through $Q_{42}$. The emitters of the transistors $Q_{51}$ through $Q_{56}$ are respectively connected in pairs to the U, V and W terminals by way of the resistors $R_{51}$, $R_{52}$ and $R_{53}$.

The embodiment having a configuration as described above operates in the following manner.

The Hall devices $21u$, $21v$ and $21w$ respectively transmit signals Vu, Vv and Vw as illustrated in FIG. 3(I) in accordance with the positional relationship between the stator and the rotor. The output signals Vu, Vv and Vw from the Hall devices $21u$, $21v$ and $21w$ are sent to the signal composing circuit 26 by way of the respective Hall amplifying circuits $25u$, $25v$ and $25w$ and the signal composing circuit 26 transmits rectangular pulse signals (Vu', Vv' and Vw') as illustrated in FIG. 3(II). These output signals are modified in terms of amplitude in the signal circuits 27a and 27b by current error signal Sc to respectively produce select signals Sda and Sdb. The select signals Sda and Sdb may be formed in a manner different from the one described above.

The select signals Sda and Sdb are respectively applied to the positive and negative side groups of switching devices 22a and 22b for switching the current supplied to the 3-phase drive coils Lu, Lv and Lw. On the basis of the current supplied to the drive coils Lu, Lv and Lw, a current error signal Sc is generated to control the level of the current supplied to the drive coils Lu, Lv and Lw by means of the current detecting resistor 28 and the current control means 23.

Figure 4:
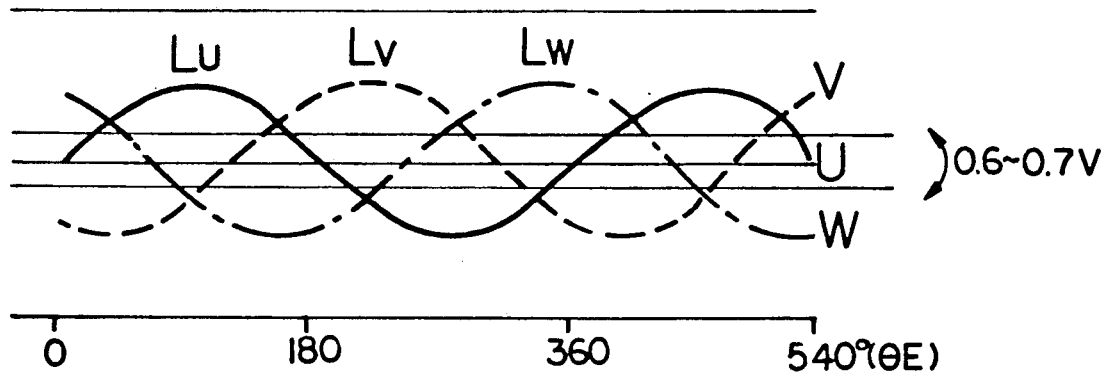
FIG. 4 shows the waveform of a counter electromotive voltage that can be generated in the drive coils of FIG. 1 when the brake circuit is removed.

Now, let us assume that both the positive and negative side select signals Sda and Sdb are cut off and the rotor is rotated solely by inertia. If it is further assumed that the brake circuit is non-existent, the counter electromotive voltages generated in the drive coils LU, Lv and Lw (at the terminals U, V and W) vary between the power source voltage +Vcc and the ground potential (GND) relative to the angle of rotation 6 as illustrated in FIG. 4. It should be noted that points A and B show a potential difference of between 0.6 and 0.7 volts under the influence of the forward voltage of the diode $D_{50}$.

When the brake circuit 24 is inserted under this condition, it operates in the following manner as described for phase U.

Firstly, referring to FIG. 4, the counter electromotive voltage in phase U having a sine waveform rises gradually from point C (middle point of the connections of the drive coils Lu, Lv and Lw) and, when it goes up above point B by 0.6 to 0.7 volts, the transistor $Q_{54}$ of the brake circuit 24 is turned on so that an electric current flows into the transistor $Q_{40}$ by way of the resistor $R_{51}$. At this stage, the collector of the transistor $Q_{34}$ begins to block the rising tendency of the counter electromotive voltage. Consequently, the voltage at point U does not rise any further and therefore generation of any additional counter electromotive voltage is suppressed. This signifies that the counter electromotive voltage is consumed within the circuit and consequently brakes the rotor.

When, to the contrary, the counter electromotive voltage in phase U does down below point A by 0.6 to 0.7 volts, the transistor $Q_{51}$ of the brake circuit 24 is turned on so that the base current of the transistor $Q_{37}$ flows toward point U by way of the resistor $R_{51}$. Consequently, the transistors $Q_{37}$ and $Q_{31}$ are turned on. At this stage, the emitter of the transistor $Q_{31}$ begins to block the filling tendency of the counter electromotive voltage. Thus, the voltage at point U does not rise any further and therefore generation of any additional counter electromotive voltage is suppressed. This signifies u that the counter electromotive voltage is consumed within the circuit and consequently brakes the rotor.

As the brake circuit 24 operates in a manner as described above, the current feedback signal is so utilized that the counter electromotive voltage generated in the drive coils Lu, Lv and Lw when the current supplied to the drive coils Lu, Lv and Lw is interrupted may be suppressed to about a half of the power source voltage +Vcc.

Figure 5:
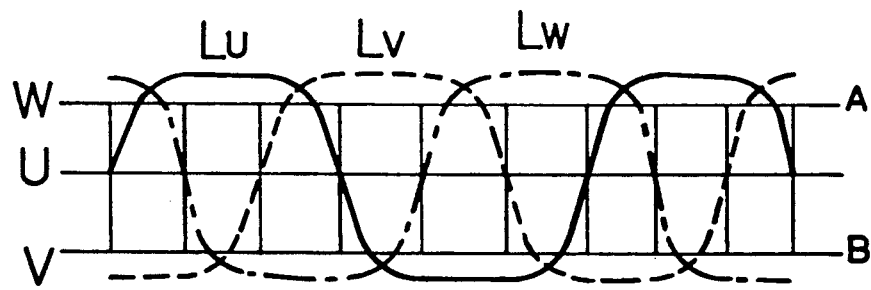
FIG. 5 shows the waveform of a counter electromotive voltage that can be generated in the drive coils of FIG. 1 when the brake circuit is operative.

It may be easily understood that the above description also holds true for both phases V and W and the brake circuit effectively operates. FIG. 5 shows how the brake circuit operates.

Figure 6:
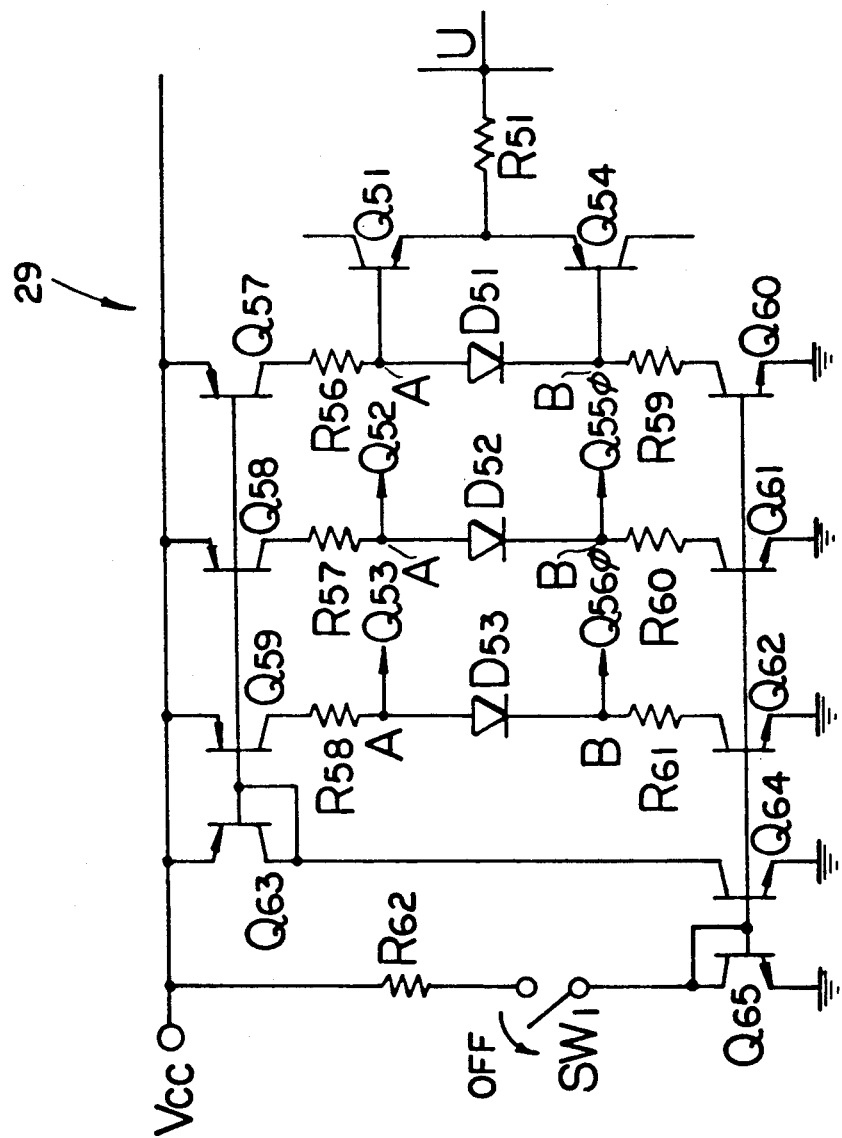
FIGS. 6 through 8 are circuit diagrams of other embodiments of the invention, each comprising a brake release circuit according to the invention.

FIG. 6 illustrates a second embodiment of the invention which comprises, besides the circuit components illustrated in FIGS. 1 and 2 for the first embodiment, a brake release circuit 29 that operates to release the brake when the motor is in operation or whenever the use of the brake is not needed.

The brake release circuit 29 comprises transistors $Q_{57}$ through $Q_{62}$ and $Q_{63}$ through $Q_{65}$, diodes $D_{51}$ through $D_{53}$, resistors $R_{56}$ through $R_{62}$ and a switch $SW_1$.

It should be noted that potential points A and B of the brake circuit 24 at which the brake starts operating are not affected by the phase. The brake release circuit 29 is designed to connect the point A of the brake circuit 24 to the power source +Vcc by way of the transistors $Q_{57}$ through $Q_{59}$ and the resistors $R_{56}$ through $R_{59}$ and the point B of the brake circuit 24 to the ground potential (GND), by way of the transistors $Q_{60}$ through $Q_{62}$, the resistors $R_{59}$ through $R_{61}$. When the switch $SW_1$ is opened, the transistor $Q_{64}$ is turned off, causing all the transistors $Q_{57}$ through $Q_{62}$ to be turned off, so that the potentials A and B are totally in a floating condition for every phase and hence the transistors $Q_{51}$ and $Q_{56}$ of the brake circuit 24 are not turned on for any counter electromotive voltage of the drive coils Lu, Lv and Lw, making the brake totally ineffective.

Figure 7:
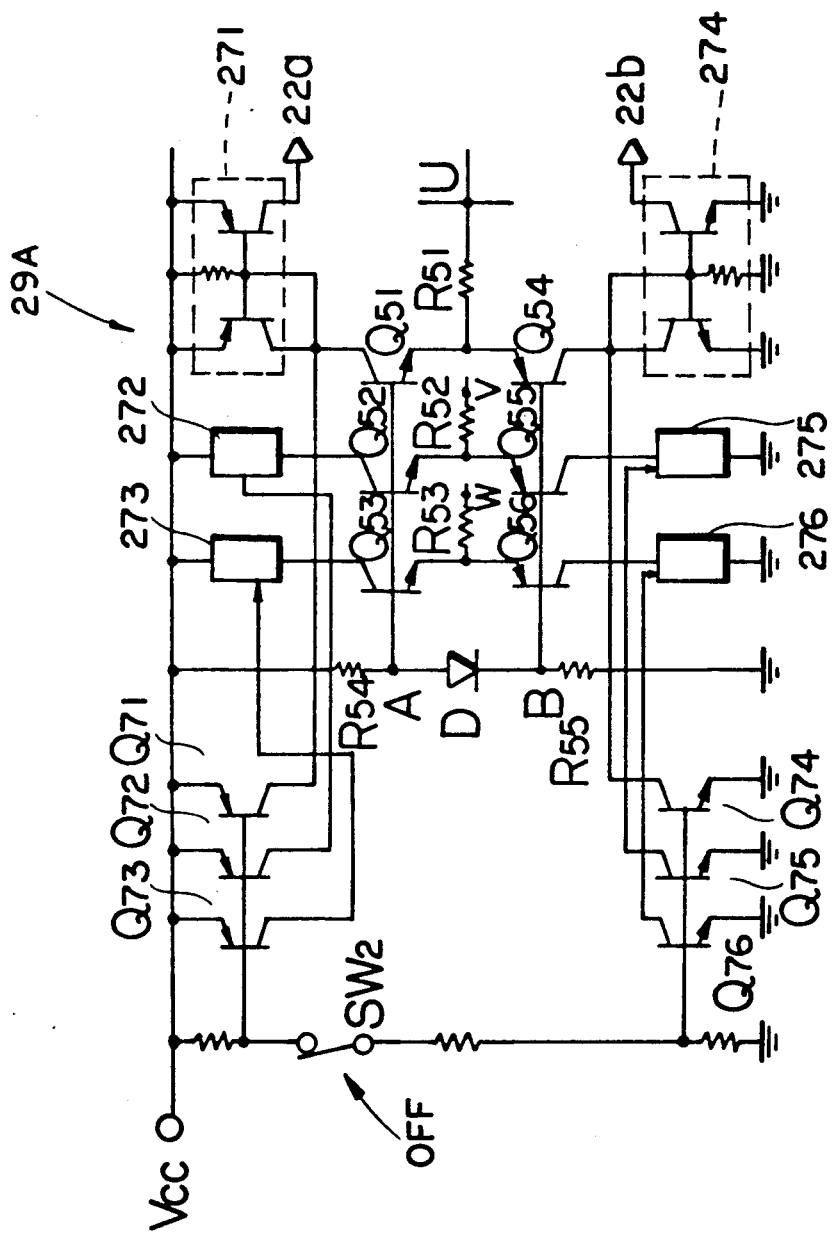

FIG. 7 illustrates another brake release circuit.

With this brake release circuit 29A, mirror circuits 271 through 273 are respectively connected between the collectors of the transistors $Q_{51}$ through $Q_{53}$ of the brake circuit 24 as illustrated in FIG. 2 and the power source +Vcc while mirror circuits 272 through 276 are respectively connected between the collectors of the transistors $Q_{54}$ through $Q_{56}$ and the ground potential (GND), to which transistors $Q_{71}$ through $Q_{73}$ and $Q_{74}$ through $Q_{76}$ are connected so that the signal from switch $SW_2$ may be applied to the bases of transistors $Q_{71}$ through $Q_{73}$ and $Q_{74}$ through $Q_{76}$. In the drawing, the mirror circuits 272, 273, 275 and 276 are shown only as so many blocks.

When the switch $SW_2$ of the brake release circuit 29A is depressed, all the transistors $Q_{71}$ through $Q_{73}$ and $Q_{74}$ through $Q_{76}$ are turned on and the mirror circuits 271 through 273 and 274 through 276 are turned off to make the brake circuit 24 inoperative. When, on the other hand, the switch $SW_2$ is released, all the transistors $Q_{71}$ through $Q_{73}$ and $Q_{74}$ through $Q_{76}$ are turned off and the brake circuit 24 becomes operative.

Figure 8:
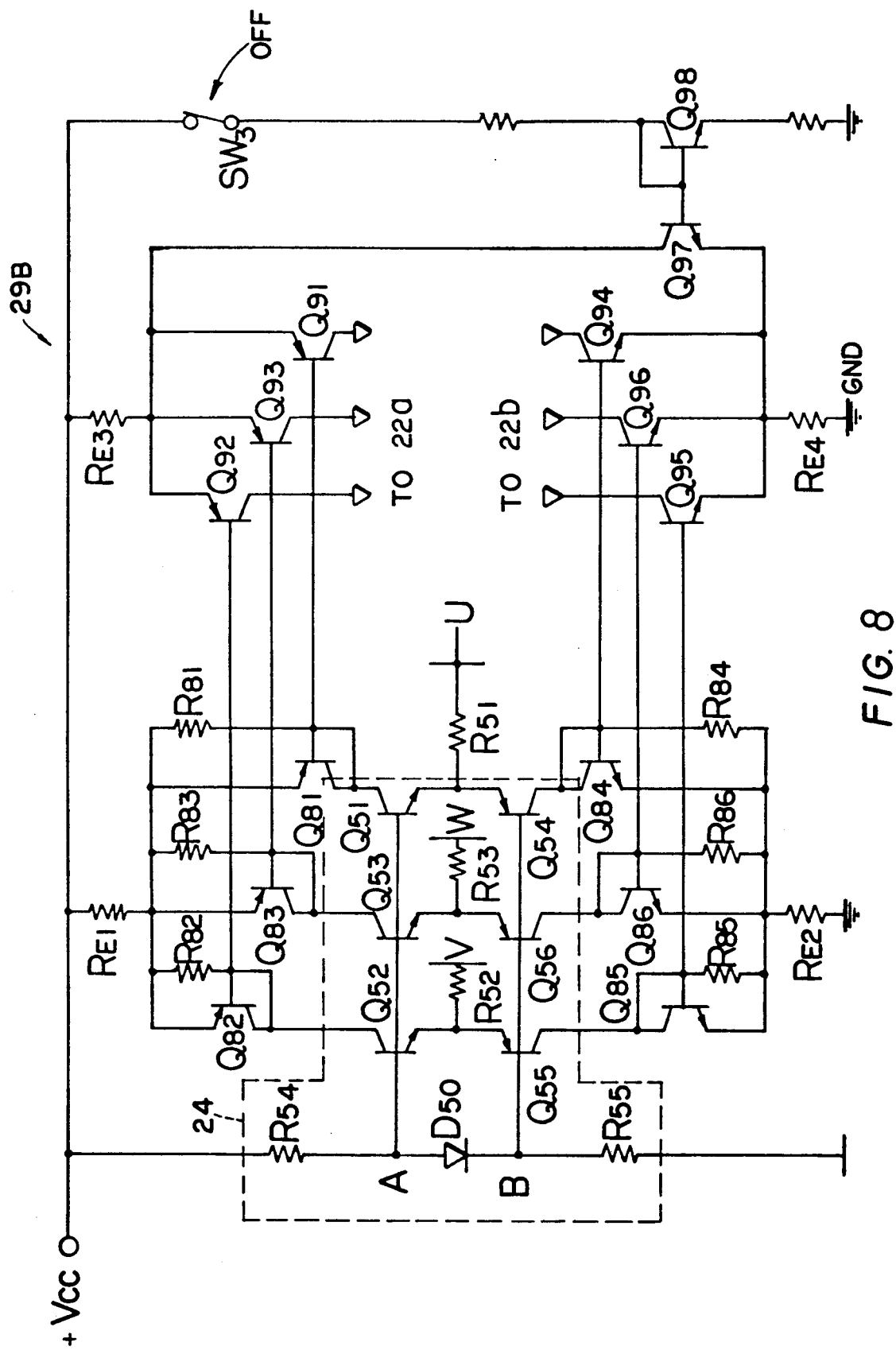
Figure 9:
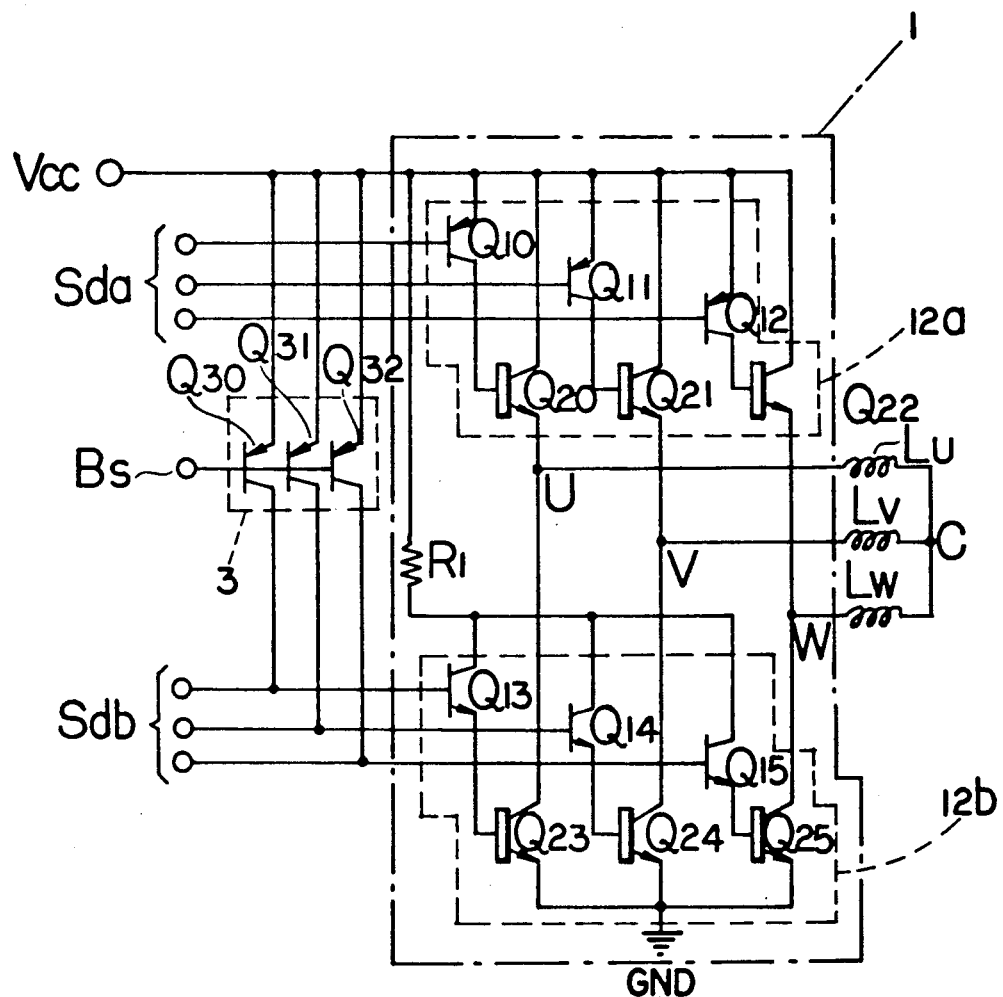
FIG. 9 is a circuit diagram of a conventional brushless motor drive and brake circuit.

FIG. 8 illustrates still another brake release circuit.

With this brake release circuit 29B, circuits comprising respectively transistors $Q_{81}$ through $Q_{83}$, resistors $R_{81}$ through $R_{83}$ and resistor $R_{E1}$ are respectively connected between the transistors $Q_{51}$ through $Q_{53}$ of the brake circuit 24 as illustrated in FIG. 2 and the power source +Vcc, while circuits comprising respectively transistors $Q_{84}$ through $Q_{86}$, resistors $R_{84}$ through $R_{86}$ and resistor $R_{E2}$ are respectively connected between the transistors $Q_{54}$ through $Q_{56}$ and the ground potential (GND), to which circuits respectively comprising transistors $Q_{91}$ through $Q_{93}$ and resistor $R_{E3}$ and circuits respectively comprising transistors $Q_{94}$ through $Q_{96}$ and resistor $R_{E4}$ are connected, while the output terminals of the transistors $Q_{91}$ through $Q_{93}$ are connected with the input terminals of the positive side group of switching devices 22a and those of the transistors $Q_{94}$ through $Q_{96}$ are connected with the input terminals of the negative side group of switching devices 22b. The emitters of the transistors $Q_{91}$ through $Q_{93}$ and $Q_{94}$ through $Q_{96}$ are connected with transistor $Q_{97}$, to which ON/OFF signals of the switch $SW_3$ are applied by way of transistor $Q_{98}$.

Again, when the switch $SW_3$ of the brake release circuit 29 is depressed, the transistor $Q_{97}$ is turned on and currents having a level higher than that of the currents running through the common emitter resistors $R_{E1}$ and $R_{E2}$ are supplied to the common emitter resistors $R_{E3}$ and $R_{E4}$. Consequently, the brake signals transmitted from the collectors of the $Q_{51}$ through $Q_{53}$ and $Q_{54}$ through $Q_{56}$ are not applied any more to the input terminals of the positive and negative side groups of switching devices 22a and 22b and the brake circuit 24 becomes inoperative to release the brake.

While the present invention has been described by way of preferred embodiments, the present invention is not limited thereto and various alterations and modifications are possible without departing from the spirit and the scope of the invention. For example, while the above embodiments are realized in the form of a 3-phase drive circuit, a 2-phase or 4-phase drive circuit may be also possible. The diode $D_{50}$ in the brake circuit 24 of FIG. 2 may be omitted. When a resistor with a resistance of about 0.5 Ω is connected to the power source +Vcc or the ground potential [GND] of FIG. 2 and used in combination with the brake release circuit 29, the effect of the brake can be freely controlled.

As is apparent from the above description of the present invention, since the counter electromotive voltage is suppressed to about a half of the power source voltage, a brushless motor drive circuit according to the inventions operates free from any malfunctions. Moreover, since no protecting circuit is required for a brushless motor drive circuit according to the invention, the overall dimensions of the circuit can be significantly reduced. Besides, since counter electromotive voltage is utilized to operate the brake circuit, no reactive current appears in the circuit.

When a brake release circuit is introduced into a brushless motor drive circuit according to the invention, the brake circuit can be made inoperative whenever desired.

What is claimed is:

1. A brushless motor drive circuit for a motor having a stator with m-phase drive coils and a rotor having magnetic poles, said stator being arranged to have current flow through the m-drive coils in either direction, a source of voltage being provided to power said circuit, said drive circuit comprising:
    position detecting means for generating m-phase output signals in accordance with the positional relationship between the rotor and the stator;
    a plurality of switching devices for switching the direction of the current being supplied to said m-phase drive coils in accordance with the output signals from said position detecting means;
    current control means for controlling the level of the current being supplied to said drive coils by means of said plurality of switching devices; and
    brake circuit means for braking said rotor by feeding voltage from the power source voltage to said drive coils for suppressing said counter electromotive voltage to a fractional portion of the power source voltage when the current supplied to said drive coils is interrupted.

2. The brushless motor drive circuit according to claim 1 wherein the fractional portion of the power source voltage is about half.

3. The brushless motor drive circuit according to claim 1, wherein said circuit further comprises a brake release circuit for making said brake circuit inoperative.

4. In a brushless motor drive circuit for a motor having a stator with m-phase drive coils and a rotor having magnetic poles, said stator being arranged to have current from a power supply circuit flow through the m-phase drive coils in either direction under control of a plurality of drive power switches which are responsive to m-phase output signals from position detecting means that measure the positional relationship between the rotor and the stator, the improvement comprising:
    a plurality of control switches coupled to said drive coils, said control switches changing state in response to the counter electromotive signals generated in the drive coils when current to the drive coils is interrupted,
    said drive power switches being responsive to said change of state of said control switches to couple the power supply to the drive coils to reduce the counter electromotive signals,
    said control switches turning on in response to the absolute value of the counter electromotive signals passing a threshold in an increasing direction and turning off in response to the absolute value of the counter electromotive signals passing a threshold in a decreasing direction,
    whereby when said drive power switches are turned off, the counter electromotive signals generated by said drive coils are coupled to said control switches to apply a signal from the power supply circuit through the drive power switches to the drive coils to reduce the counter electromotive signals.

5. The improvement of claim 4 wherein:
    there are 2m control switches, a separate one of said control switches being responsive to the counter electromotive signal from each of said drive coils passing a positive voltage threshold and a separate one of said control switches being responsive to a counter electromotive voltage from each of said drive coils passing a negative voltage threshold, and
    there are 2m drive power switches, each of said 2m drive power switches being responsive to the turning on of a separate one of said 2m control switches to provide coupling between the power supply circuit and the associated one of the m drive coils that is coupled to said one of said 2m control switches.

6. In a brushless motor drive circuit for a motor having a stator with m-phase drive coils and a rotor having magnetic poles, said stator being arranged to have current from a power supply circuit flow through the m drive coils in either direction under control of 2m drive power switches which are responsive to m-phase output signals from position detecting means that measure the positional relationship between the rotor and the stator, each of the m drive coils generating a counter electromotive signal when the drive power switches are turned off thereby creating m counter electromotive signals, each signal having a positive phase and a negative phase, the improvement comprising:

m pairs of control switches, each of said pairs coupled to a separate one of the m drive coils and responsive to a separate one of said counter electromotive signals, in each of said pairs of control switches, a first control switch changing state in response to the counter electromotive signal of the associated drive coil increasing positive past a threshold, and a second control switch changing state in response to the counter electromotive signal of said associated drive coil increasing negative past a threshold, each of said 2m drive power switches being responsive to the change of state of a separate one of said 2m control switches to couple the power supply circuit to the one of said drive coils coupled to the associated one of said control switches to reduce the counter electromotive signal generated by said one of said drive coils, whereby when said drive power switches are turned off, the counter electromotive voltage generated by said drive coils is coupled to said control switches to apply said circuit power to reduce the counter electromotive voltage.

* * * * *